United States Patent
Corva et al.

(10) Patent No.: US 6,894,471 B2
(45) Date of Patent: May 17, 2005

(54) METHOD OF REGULATING THE SUPPLY VOLTAGE OF A LOAD AND RELATED VOLTAGE REGULATOR

(75) Inventors: Giulio Corva, Vittuone (IT); Adalberto Mariani, Garlasco (IT)

(73) Assignee: ST Microelectronics S.r.l., Agrate Brianza (IT)

( * ) Notice: Subject to any disclaimer, the term of this patent is extended or adjusted under 35 U.S.C. 154(b) by 6 days.

(21) Appl. No.: 10/449,821

(22) Filed: May 30, 2003

(65) Prior Publication Data

US 2004/0032242 A1 Feb. 19, 2004

(30) Foreign Application Priority Data

May 31, 2002 (EP) .............................................. 02425359

(51) Int. Cl.[7] .............................................. G05F 1/40
(52) U.S. Cl. ..................................... 323/282; 323/285
(58) Field of Search ................................ 323/282, 283, 323/284, 285, 351

(56) References Cited

U.S. PATENT DOCUMENTS

| | | | | |
|---|---|---|---|---|
| 5,548,206 A | * | 8/1996 | Soo ............................... 323/284 |
| 5,804,950 A | | 9/1998 | Hwang et al. ................ 323/222 |
| 5,912,552 A | * | 6/1999 | Tateishi ........................ 323/285 |
| 5,917,312 A | | 6/1999 | Brkovic ........................ 323/282 |
| 6,064,187 A | * | 5/2000 | Redl et al. .................... 323/285 |
| 6,181,120 B1 | | 1/2001 | Hawkes et al. .............. 323/282 |
| 6,229,292 B1 | | 5/2001 | Redl et al. .................... 323/285 |
| 6,396,251 B2 | | 5/2002 | Corva et al. ................. 323/283 |
| 6,580,258 B2 | * | 6/2003 | Wilcox et al. ............... 323/282 |

FOREIGN PATENT DOCUMENTS

JP 2001339953 7/2001 ............ H02M/7/12

* cited by examiner

*Primary Examiner*—Adolf Berhane
(74) *Attorney, Agent, or Firm*—Allen, Dyer, Doppelt Milbrath & Gilchrist, P.A.; Lisa K. Jorgenson

(57) ABSTRACT

The method is for regulating the supply voltage of a load via a switching voltage regulator having an inductor driven by at least a power switch for delivering current to an output capacitor having a certain parasitic series resistance, connected between the output node of the regulator and ground and to an electric load eventually connected in parallel to the output capacitor. The method includes establishing a reference voltage, generating a comparison signal as the sum of a first voltage signal proportional to the current circulating in the inductor and of a second voltage signal depending on the difference between the output voltage and the reference voltage and on the first voltage signal. The comparison signal is compared with at least a threshold for generating a logic signal that switches between an active state and an inactive state and viceversa each time that the threshold is crossed, and the turn on or the turn off of the switch is controlled as a function of the state of the logic signal.

19 Claims, 11 Drawing Sheets

METHOD OF REGULATING THE SUPPLY VOLTAGE OF A LOAD AND RELATED VOLTAGE REGULATOR

FIELD OF THE INVENTION

The present invention relates to voltage regulators, and more particularly to a method of regulation of the supply voltage of a load, a method of operating a regulator and a related voltage regulator.

BACKGROUND OF THE INVENTION

Some types of electric loads are subject to rapid variations of the absorbed current. The variation may go from an almost null current to the nominal maximum current and vice versa. The regulator (generally a switching regulator) that supplies these loads must be capable of maintaining the regulated voltage in a pre-defined range of accuracy (dynamic precision), which is often very narrow. For instance, processors used in portable computers supplied by batteries mostly in a stand-by mode during which their consumption is relatively low and from which they resume operation when instructions must be carried out.

The commonly used regulators have a closed loop control of the output voltage $V_{OUT}$ to ensure under steady state conditions, i.e. with a constant load, that the regulated voltage is equal to the desired voltage $V_{REF}$ independently from the load and the input voltage of the regulator. Of course, during a load transient this is no longer true. The speed with which the regulator adjusts the output voltage to the desired voltage $V_{REF}$, depends on the type of control used by the regulator and on the characteristics of the power stage.

Regulators that implement a control with hysteresis of the output voltage, as the regulator depicted in FIG. 1, generally provide for the fastest response to a load transient and are the most commonly used. Because of the importance of these regulators, in the ensuing description reference will be made to regulators with hysteresis, but the discussion also applies to regulators without hysteresis. Moreover, it will be discussed in detail the operation of known regulators with a high side power switch (HS) that switches the inductor to the supply voltage source. However, this is influential in identifying the particular technical problem being addressed and which is present also in regulators of different topology (for instance step-up regulators) wherein the inductor is switched to ground by a low side (LS) switch instead of to the supply voltage source.

A comparator with hysteresis of the output voltage $V_{OUT}$ and the reference voltage $V_{REF}$ determines the turn on and the turn off of the switch HS of the branch toward the node at the highest potential of an output half-bridge. If a constant turn on time ($T_{ON}$) control is carried out, a comparator without hysteresis is used instead and the switch HS remains on for a fixed time $T_{ON}$ once it is turned on, while in a constant turn off time ($T_{OFF}$) control mode, the comparator switches off the switch HS. The kinds of controls mentioned above contemplate also variants in which the equivalent voltage at the input of the comparator is the integral-proportional voltage error ($V^2$ control) or the sum of the integral-proportional error and of a voltage proportional to the current in the inductor (current-mode control).

In a so-called forced turn on control (or forced turn off), a clock signal is provided to the command logic CONTROL LOGIC that forces the turn on (the turn off) of the switch HS with a period $T_S$, while the turn off (turn on) instant is determined by the comparator. Sometimes a minimum turn on time $T_{ON,MIN}$ (minimum turn off time $T_{OFF,MIN}$) of the switch HS is imposed. Typically, in these kinds of synchronous control a current mode control is implemented. A saw-tooth signal synchronous with the clock is usually applied to an input of the comparator for preventing sub-harmonic instability.

In a PWM control, a modulator varies the duty-cycle proportionally to a control (voltage) signal applied to an input thereof. The turn on of the switch HS is usually synchronous with an external clock. The voltage integral-proportional error is applied at the control input. These regulators are relatively slow at regulating the output voltage to its reference value after a load variation has occurred, because they are never capable of reacting sufficiently fast to a very fast load transient.

For these reasons, an output capacitor in parallel to the load is capable, within certain limits, of allowing for an abrupt increase of the current absorption of the load while limiting the error on the output voltage. In general, the output capacitor has a non-negligible parasitic series resistance ERS dependent on the capacitance of the output capacitor $C_{OUT}$. The corresponding time constant $T_C = ESR \cdot C_{OUT}$ depends on the type of capacitor (tantalum, ceramic, organic electrolytic, etc.) and is to a large extent independent of the capacitance.

The power switch (or switches) has also an influence, besides the controller, in determining the effective response speed of the regulator. There is in fact a limit to the speed (slew-rate limitation) of variation of the current that the output power stage may furnish to the electric parallel of the load and of the output capacitor. For instance, if the switch HS is turned on, the current $i_L$ circulating in the inductor cannot increase at a speed greater than $$\frac{di_L}{dt} \leq m_p = \frac{V_{IN} - V_{OUT}}{L} \qquad (1)$$

while, if the switch HS is turned off, the current cannot fall at a speed smaller than $$\frac{di_L}{dt} \geq -m_m = -\frac{V_{OUT}}{L}. \qquad (2)$$

In a regulator with constant turn on time, phases of duration $T_{ON}$ during which the switch HS is turned on alternate with phases of duration $T_{OFF,MIN}$ during which the switch is turned off, thus the mean speed variation of the output current is $$m_p = \left( T_{ON} \cdot \frac{V_{IN} - V_{OUT}}{L} - T_{OFF,MIN} \cdot \frac{V_{OUT}}{L} \right) \cdot \frac{1}{T_{ON} + T_{OFF,MIN}}. \qquad (3)$$

If for example the output current undergoes to a step increase $\Delta I_{OUT}$, the output voltage $V_{OUT}$ drops abruptly by an amount equal to $ESR \cdot \Delta I_{OUT}$. Depending on the response speed of the regulator, the output voltage $V_{OUT}$ may thereafter raise back to the reference voltage or continue falling. For instance, in a regulator with hysteresis (e.g. with a constant turn on time $T_{ON}$), if the voltage $V_{OUT}$ is lower than the reference voltage, the output current $I_{OUT}$ increases with a slope given by eq. 1 (eq. 3). The output voltage will not fall further if $$m_p \geq \frac{\Delta I_{OUT}}{ESR \cdot C_{OUT}}. \quad (4)$$

FIG. 2 depicts the waveforms of the main signals of the regulator with hysteresis of FIG. 1 after a load increase, being:

$\Delta I_{OUT}$=20A; L=1.2 $\mu$H; $V_{IN}$=12V; $V_{REF}$0.5V; ESR=4 m$\Omega$;

hysteresis=20 mV; $C_{OUT}$=2 mF.

Eq. 4 is verified, thus the output voltage cannot fall more than ESR·$\Delta I_{OUT}$. FIG. 3 is the response of the regulator of FIG. 1 after a load reduction of the same absolute value. By substituting $m_m$ to $m_p$, eq. 4 is no longer satisfied, thus the overshoot exceeds ESR·$\Delta I_{OUT}$. Indicating with $\Delta V_{OUT,MAX}$ the maximum variation of the output voltage and with $\Delta I_{OUT,MAX}$ the maximum variation of the output current, to satisfy the dynamic specifications the capacitance of the output capacitor must be such to ensure that $$ESR \cdot \Delta I_{OUT,MAX} \leq \frac{1}{2} \Delta V_{OUT,MAX} \quad (5)$$

wherein the voltage $V_{OUT}$ must range between $V_{REF} \pm \Delta V_{OUT,MAX}/2$.

The area occupied by the output capacitor $C_{OUT}$ and the costs thereof (which are proportional to the capacitance, and inversely proportional to the parasitic resistance ESR) have a great importance in this kind of application. The so-called "voltage positioning" technique, often used for reducing the capacitance of the output capacitor, consists in modifying the controller so that the output resistance of the regulator under steady state conditions $R_O$ is not null, and in choosing the reference voltage $V'_{REF}$:

$$V'_{REF} = V_{REF} + \frac{\Delta V_{OUT,MAX}}{2}. \quad (6)$$

In this way, the null load voltage is higher than the desired voltage $V_{REF}$ while at maximum load, under steady state conditions, is lower.

If $$R_O = ESR \quad (7)$$

then the static variation, i.e. the voltage variation after the load transient has terminated, is equal to the dynamic variation, i.e. the variation that immediately follows the load transient.

Finally, if an appropriate controller for making the regulator operate as a pure resistance of value ESR even under transient conditions is realized, that is for making the output impedance $Z_{OUT}$=ESR, then the variation of the output voltage after a step variation $\Delta I_{OUT}$ of the output current is a voltage step variation ESR·$\Delta I_{OUT}$. An example of response of a regulator with $Z_{OUT}$=ESR is depicted in FIG. 6. The specifications of dynamic accuracy are now satisfied if $$ESR \cdot \Delta I_{OUT,MAX} \leq \Delta V_{OUT,MAX} \quad (8)$$

Therefore, it is possible to use a capacitor whose capacitance is half the value of the previous evaluation.

The condition $Z_{OUT}$=ESR ensures that the output voltage $V_{OUT}$ remains in the dynamic accuracy range even if two load transients, from zero to the maximum load and vice versa, occur in rapid succession. On the contrary, if $R_O$=ESR, these transients should be spaced by a time interval long enough to allow the output voltage $V_{OUT}$ to stabilize itself. To have an output voltage with a step variation, the current in the inductor L must have an exponential profile with maximum slope $\Delta I_{OUT,MAX}/T_C$ at the transient instant. It is possible to have this kind of response only if the following equation, similar to eq. 4, is verified $$\frac{\Delta I_{OUT,MAX}}{ESR \cdot C_{OUT}} \leq m = \min(m_p, m_m). \quad (9)$$

A procedure for determining the capacitance of the output capacitor based on the above considerations is described in: Redl et al., "Optimizing the load transient of the buck converter" IEEE PESC 1998; Redl et al., "Cost-optimized design of the Pentium II converter for load transient specification" PCIM 1998-Tokio; Redl et al., Analog Devices, U.S. Pat. No. 6,064,187 May 16, 2000; and Redl et al., Analog Devices, U.S. Pat. No. 6,221,302 May 8, 2001. There are also several examples about how it may be possible to realize the regulator such that $Z_{OUT}$=ESR. In U.S. Pat. No. 6,064,187, a similar procedure is illustrated for the case in which, depending on the kind of the capacitor, the time constant $T_C$=ESR·$C_{OUT}$ is too small to satisfy eq. 9. In this case it is not possible to have $Z_{OUT}$=ESR and $Z_{OUT}$ is chosen such that $$Z_{OUT} = ESR + \frac{R_O - ESR}{1 + sR_O C_{OUT}} \quad (10)$$

wherein $R_O$ is the output resistance in steady state conditions, that must be greater than ESR, and s is the complex frequency. The consequence is that the response of the regulator to a variation $\Delta I_{OUT,MAX}$ is a voltage step whose amplitude is ESR·$\Delta_{OUT,MAX}$ followed by a further exponential increment as long as the value $R_O \cdot \Delta I_{OUT,MAX}$ is finally reached.

Therefore, to satisfy the specifications on the maximum voltage variation $\Delta V_{OUT,MAX}$ it must be $$R_O = \frac{\Delta V_{OUT,MAX}}{\Delta I_{OUT,MAX}}. \quad (11)$$

The current in the inductor has an exponential waveform but the maximum variation speed now is $\Delta I_{OUT,MAX}/R_O \cdot C_{OUT})$. It is then possible to choose the capacitor $C_{OUT}$ such that the variation speed is equal to m, obtaining $$C_{OUT} = \frac{\Delta I_{OUT,MAX}}{m \cdot R_O} = \frac{\Delta V_{OUT,MAX}}{m \cdot R_O^2}. \quad (12)$$

For greater values of the capacitor $C_{OUT}$, a smaller slope will be obtained, thus eq. 12 gives the minimum value which is necessary and sufficient to satisfy the specifications. It is easy to verify that, with the chosen values, it is indeed ESR<$R_O$.

Generally, a regulator operates to nullify a comparison signal $V_{COMP}$ that is determined in function of the output voltage $V_{OUT}$ and of the current flowing in the inductor $I_L$ through linear filtering operations. The comparison signal $V_{COMP}$ is in general given by:

$$V_{COMP} = (V_{OUT} - V'_{REF}) \cdot B(s) + R_S A(S) I_L \quad (13)$$

wherein s is the complex frequency and $R_S$ is a sensing resistance in series to the inductor L. The sensing resistance may even be substituted by other circuit means capable of providing a voltage signal proportional to the current circulating in the inductor, for instance a circuit having an auxiliary winding magnetically coupled to the inductor. In this case the following formulas are valid, provided that $R_S$ is the (constant) ratio between the voltage signal and the current circulating in the inductor L.

For sake of simplicity, in the ensuing description reference will be made to the case in which the voltage signal is generated by a sensing resistance ($R_S$).

The output impedance is given by:

$$\frac{1}{Z_{OUT}} = \frac{V_{OUT} - V'_{REF}}{I_{OUT}} = \frac{C(s)}{R_S} + \frac{1}{\frac{1}{sC_{OUT}} + ESR} \tag{14}$$

wherein $$C(s) = \frac{B(s)}{A(s)}.$$

In order to have $Z_{OUT}$=ESR it must be $$C(s) = \frac{R_S}{ESR} \cdot \frac{1}{1 + sC_{OUT} \cdot ESR}. \tag{15}$$

On the contrary, if C(s) is given by $$C(s) = \frac{R_S}{R_O} \cdot \frac{1}{1 + sC_{OUT} \cdot ESR} \tag{16}$$

an output impedance $Z_{OUT}$ given by eq. 10 is obtained.

It is worth noting that only the ratio B(s)/A(s) is determined, thus it is possible to choose B(s) or A(s).

A very simple way for obtaining a voltage drop proportional to the output current consists in connecting in series to the inductor and in cascade to the feedback input of the logic command circuit CONTROL LOGIC of the switches, a resistance equal to ESR. It is easy to notice that in this way it is not possible to satisfy the condition $Z_{OUT}$=ESR.

In U.S. Pat. No. 6,064,187 to Redl et al., many solutions are proposed, in which the coefficients A(s) and B(s) are $$\begin{cases} A(s) = 1 \\ B(s) = \frac{R_S}{R_O} \cdot \frac{1}{1 + sC_{OUT}ESR} \end{cases} \tag{17}$$

and in which the resistance $R_O$ is given by eq. 11 or by eq. 7. The comparator is input with a filtered and attenuated error signal and with the voltage read on the sensing resistor. Several examples are depicted in FIGS. 4 and 5. For example, the circuit of FIG. 5 satisfies eq. 17, with $R_O$ given by eq. 7 or by eq. 11, if $$\begin{cases} C_1 \frac{1}{\frac{1}{R_1} + \frac{1}{R_2}} = ESR \cdot C_{OUT} \\ \frac{R_1}{R_1 + R_2} = \frac{R_S}{R_O} \end{cases} \tag{18}$$

If $R_O$=ESR, eq. 18 imposes that ESR be greater than $R_S$. In other words, an equivalent output resistance $R_O$ equal to ESR is obtained using a sensing resistance $R_S$ smaller than ESR. To reduce power dissipation, it is better to choose a small sensing resistance $R_S$, considering that $R_S$ cannot be too small otherwise the voltage drop on it would be very low.

It is worth noting that hysteretic controls are stable and operate correctly when the ripple of the comparison signal $V_{COMP}$ has a substantially triangular shape. From the above equations, this ripple $V_{COMP,R}$ is given by $$V_{COMP,R} = I_{RIPPLE} \cdot A(s) \cdot R_S \cdot \frac{1 + sR_O C_{OUT}}{sR_O C_{OUT}} \tag{19}$$

wherein $I_{RIPPLE}$ is the ripple of the current in the inductor, that generally varies according to a triangular waveform. If A(s)=1, to have a substantially triangular signal $V_{COMP}$, it is necessary that $$R_O C_{OUT} \gg T_S \tag{20}$$

where $T_S$ is the switching period of switches.

A problem that burdens known regulators, independently from the position in respect to the supply voltage source of the switches that drive the inductor, consists in that the comparator has an offset voltage that reduces the accuracy with which the output voltage is regulated. The offset voltage considered, $V_{OFFSET,CMP}$, comprises the statistical offset, the delay effect of the comparator and an induced parasitic voltage due to the magnetic flux generated by the inductor through the circuit that generates the comparison signal $V_{COMP}$. The error on the output voltage caused by this offset voltage $V_{OFFSET,CMP}$ is $$\frac{R_O}{R_S} \cdot V_{OFFSET,CMP}. \tag{21}$$

To reduce the parasitic voltage, which is always present, the area of this circuit is reduced as much as possible and/or this circuit is moved away from the inductor. Both expedients complicate remarkably the realization of the regulator. Another type of inaccuracy of the known regulators is caused by the oscillations of signal $V_{COMP}$ due to the oscillations of the current flowing in the inductor. Referring to a constant turn on time $T_{ON}$ regulator, the power switch (or switches) is switched to nullify the lower peak of the voltage $V_{COMP}$. Therefore, the mean value of $V_{COMP}$ is half the peak-to-peak amplitude of the ripple.

In prior art regulators implementing the voltage positioning according to eqs. 13 and 17, this implies an error on the mean value of the output voltage equal to $\frac{1}{2} \cdot R_O \cdot I_{RIPPLE}$, in respect to the desired value $V'_{REF} - R_O \cdot I_O$, equivalent to an error on the mean value of the current equal to $\frac{1}{2} \cdot I_{RIPPLE}$. Similar considerations may be done for synchronous and $T_{OFF}$ constant controllers.

SUMMARY OF THE INVENTION

An object of the invention is to enhance the accuracy of known controllers. It has been found that disturbances on the signal $V_{COMP}$ due to the magnetic field generated by the inductor, the offset of the comparator and the oscillations of the signal $V_{COMP}$ do not produce any effect on the output voltage if the difference between the output voltage and the reference voltage is integrated. This happens because disturbances are eliminated if they manifest themselves as (equivalent) voltages superposed to the voltage $V_{COMP}$ (that is if these voltages are introduced downstream of the integrator), independently from their mean value, because of the infinite DC gain of the integrator. Disturbances induced upstream of the integrator do not produce any output error because their mean value is zero.

An object of this invention is to provide a method of regulating the supply voltage of a load via a switching voltage regulator having an inductor driven by at least a power switch for delivering current to an output capacitor having a certain parasitic series resistance, connected between the output node of the regulator and ground and to an electric load eventually connected in parallel to the output capacitor. The method includes the operations of establishing a reference voltage, generating a comparison signal as the sum of a first voltage signal proportional to the current circulating in the inductor and of a second voltage signal depending on the difference between the output voltage and the reference voltage and on the first voltage signal, comparing the comparison signal with at least a threshold for generating a logic signal that switches between an active state and an inactive state and vice versa each time that the threshold is crossed, and commanding the turn on or the turn off of the switch as a function of the state of the logic signal. The second voltage signal is generated by integrating the sum between said first signal and the difference, scaled by a certain quantity, between the output voltage of the regulator and the reference voltage.

The method of the invention is implemented by defining accordingly the design functions A(s) and B(s). After having determined $C_{OUT}$ in the known manner according to the above indicated criteria, the functions A(s) and B(s) are determined, according to this invention, as follows:

$$\begin{cases} A(s) = \dfrac{K_{INT}}{S} + 1 \\ B(s) = \alpha \dfrac{K_{INT}}{S} \end{cases} \quad (22)$$

where $$\begin{cases} K_{INT} = \dfrac{1}{ESR \cdot C_{OUT}} \\ \alpha = \dfrac{R_S}{R_O} \end{cases} \quad (23)$$

with $R_O$ given by eq. 7 or eq. 11. By substituting eqs. 22 in 23, eq. 13 may be rewritten in the form $$\begin{cases} V_{COMP} = V_{INT} + R_S I_L \\ V_{INT} = \dfrac{K_{INT}}{S} \cdot [\alpha(V_{OUT} - V'_{REF}) + R_S I_L] \end{cases} \quad (24)$$

According to this invention, an integrator is introduced in the control circuit instead of the low-pass filter with finite DC gain that is used in the known circuits.

Another object of this invention is a switching voltage regulator comprising an inductor driven by at least a power switch, a logic control circuit of the switch, circuit means capable of generating a voltage signal proportional to the current flowing in the inductor according to a certain proportionality coefficient, an output capacitor having a certain parasitic series resistance connected between the output node and ground, second circuit means capable of generating an amplified and filtered error signal, and a comparator comparing the amplified and filtered error signal and the voltage signal proportional to the current flowing in the inductor and generating a logic signal applied to an input of the logic control circuit of the power switch.

The regulator of the invention reduces the effects on the regulated output voltage of disturbances that corrupts the error signal, because said circuit means comprise an integrator of the sum between the voltage signal and the difference, scaled by a certain quantity, between the output voltage and the reference voltage. The turn on or the turn off of the switch is commanded in function of the state of the logic signal according to whether a regulator with a constant turn on time or with a constant turn off time is implemented. In case of a constant turn on time ($T_{ON}$) control, the signal generated by the comparator forces the turning on while the turning off is forced by a timer of by a clock after a certain time $T_{ON}$ from the turning on instant. In case of a constant turn off time ($T_{OFF}$) control, the comparator forces the turning off while the turning on is forced by a timer or a clock a certain time after the turning off instant. If the comparator has hysteresis, it will determine both the turn on and turn off instants. In case a clock signal is used to determine the turn on and/or the turn off instants, the comparator should be input also with a "slope compensation" signal.

BRIEF DESCRIPTION OF THE DRAWINGS

The different aspects and advantages of the invention will appear even more evident through a detailed description of several embodiments referring to the attached drawings, wherein.

DETAILED DESCRIPTION OF THE PREFERRED EMBODIMENTS

Figure 1:
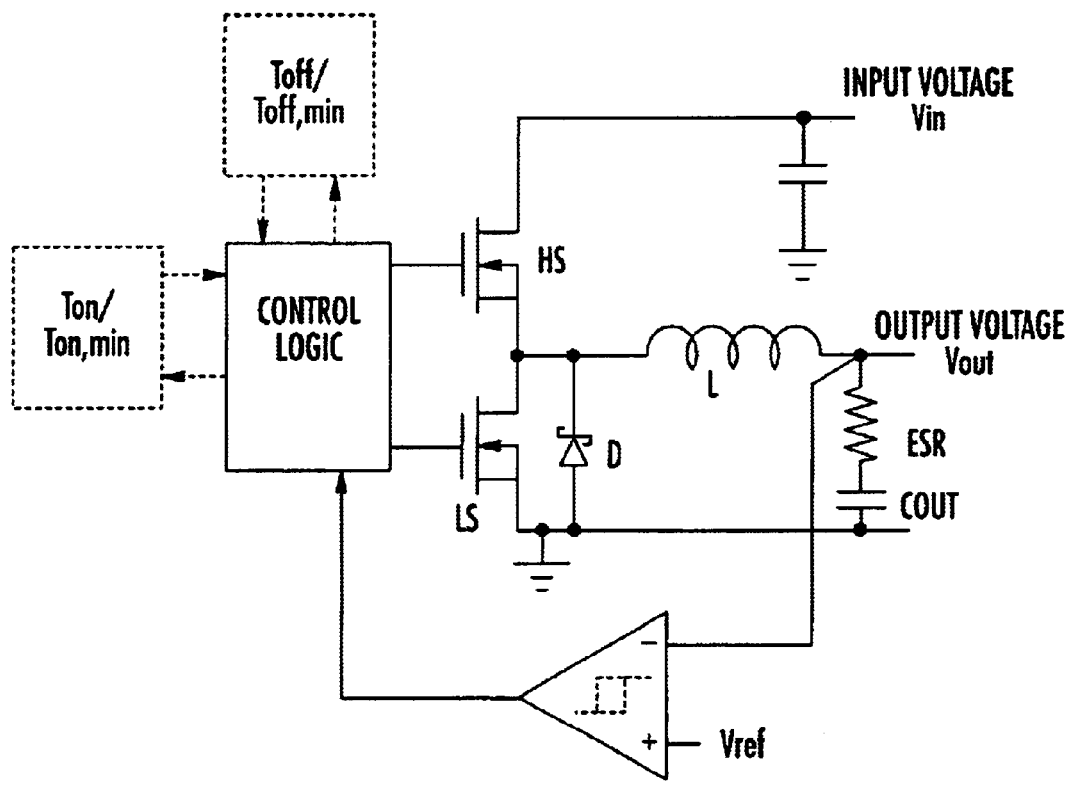
FIG. 1 is a schematic diagram depicting a known switching regulator with hysteresis as already discussed above.
Figure 2:
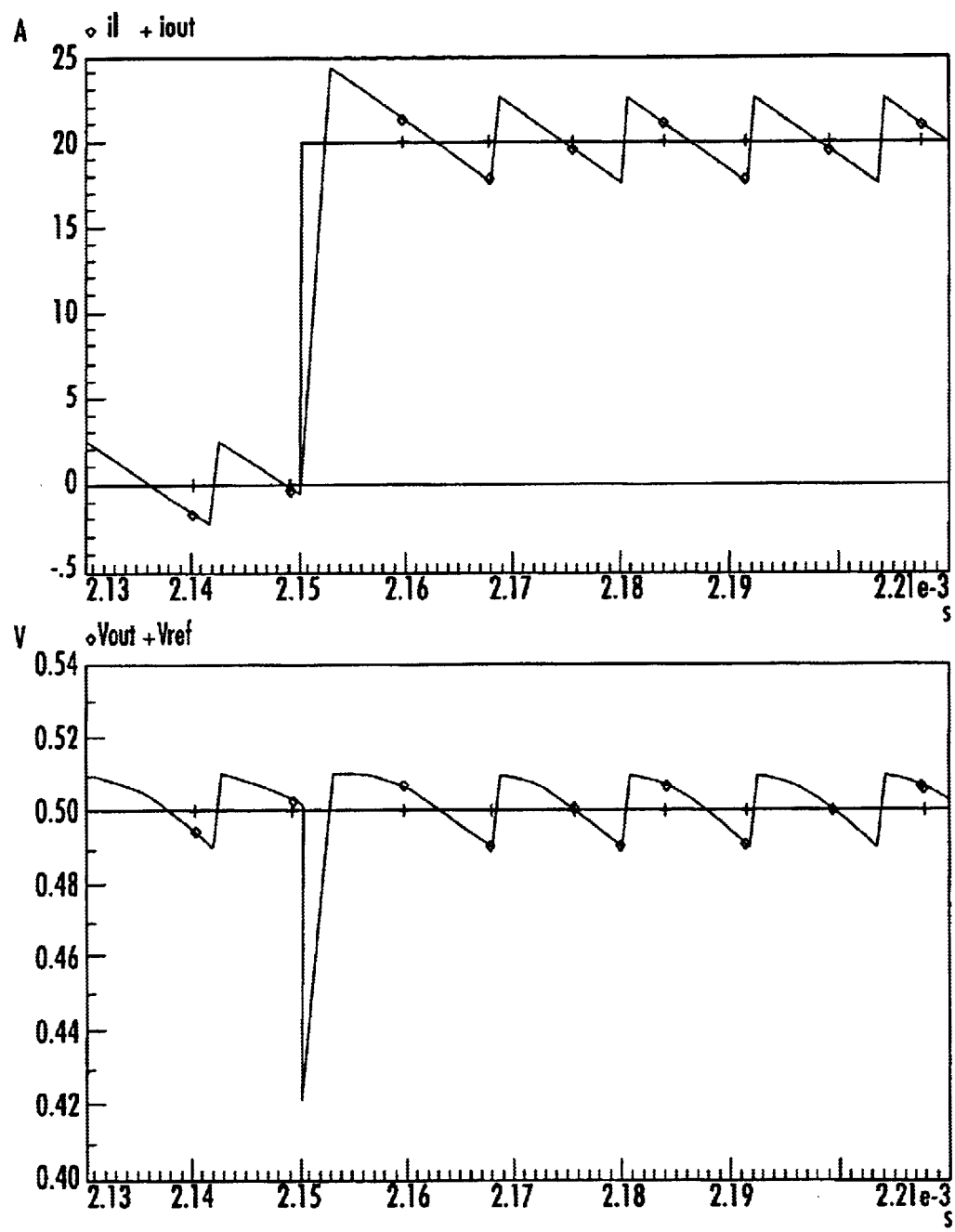
FIG. 2 is a chart showing main signals of the circuit of FIG. 1 after an increase of the current output to the load.
Figure 3:
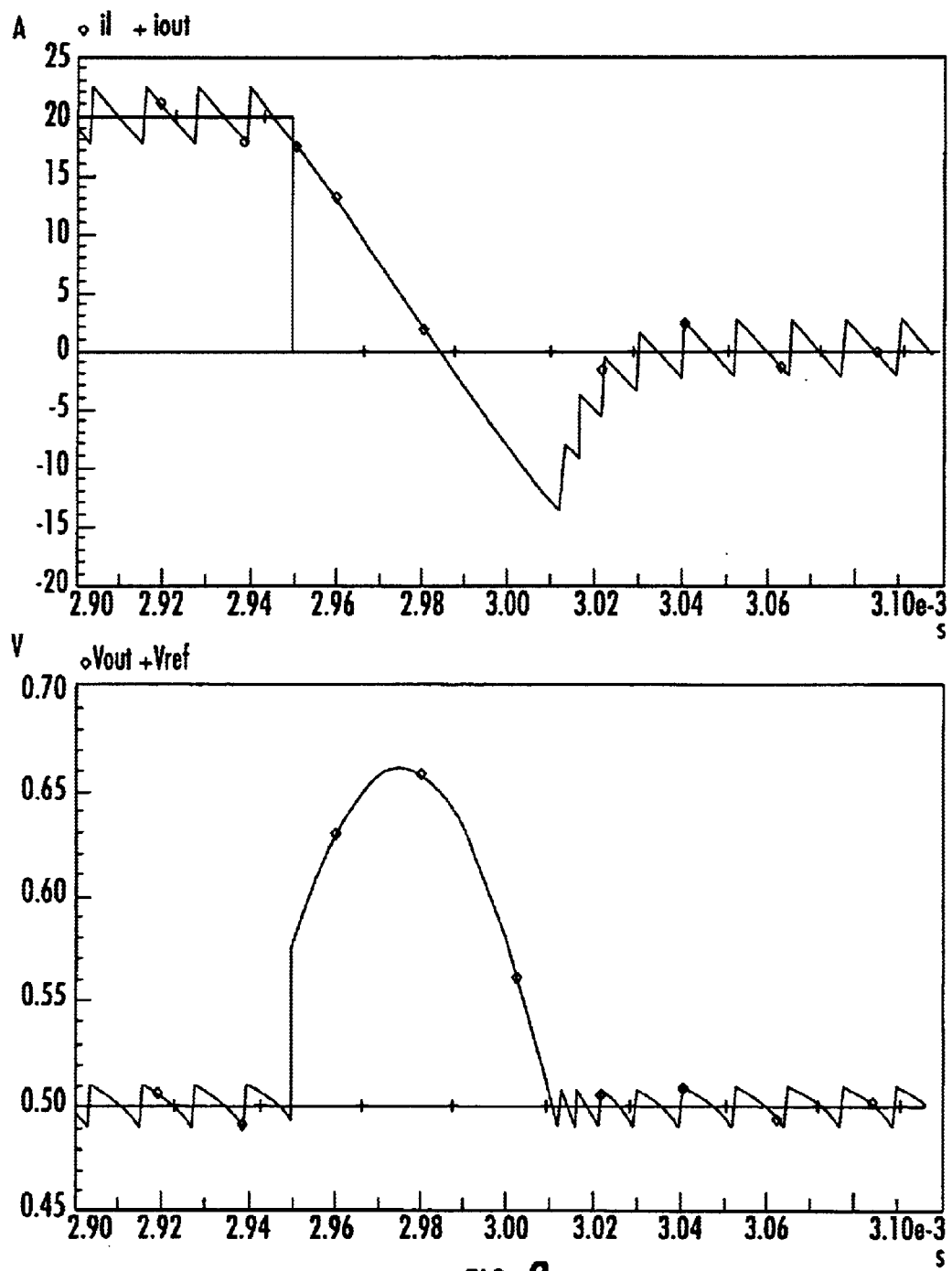
FIG. 3 is a chart showing the main signals of the circuit of FIG. 1 after a reduction of the current output to the load.
Figure 4:
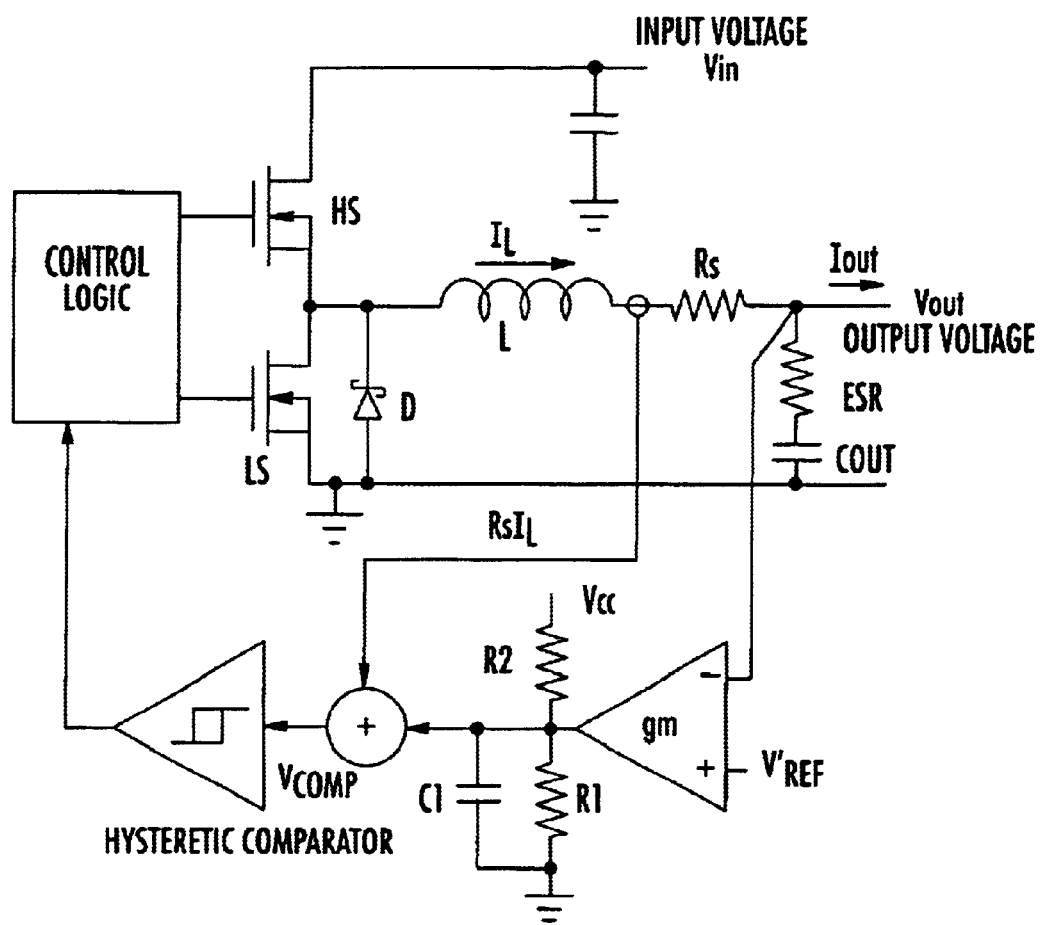
FIGS. 4 and 5 are schematic diagrams depicting two known hysteresis regulators that implement the "voltage positioning" technique.
Figure 5:
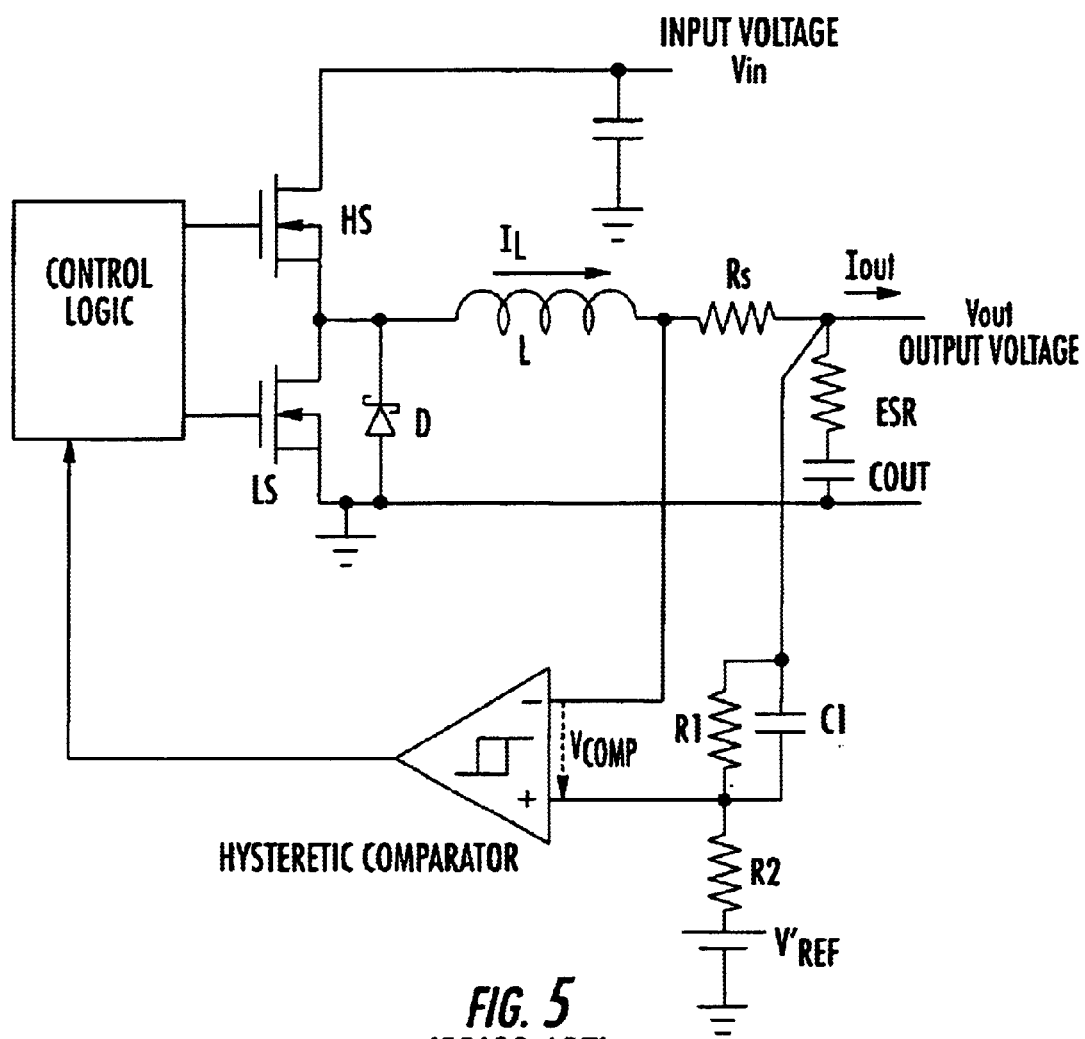
Figure 6:
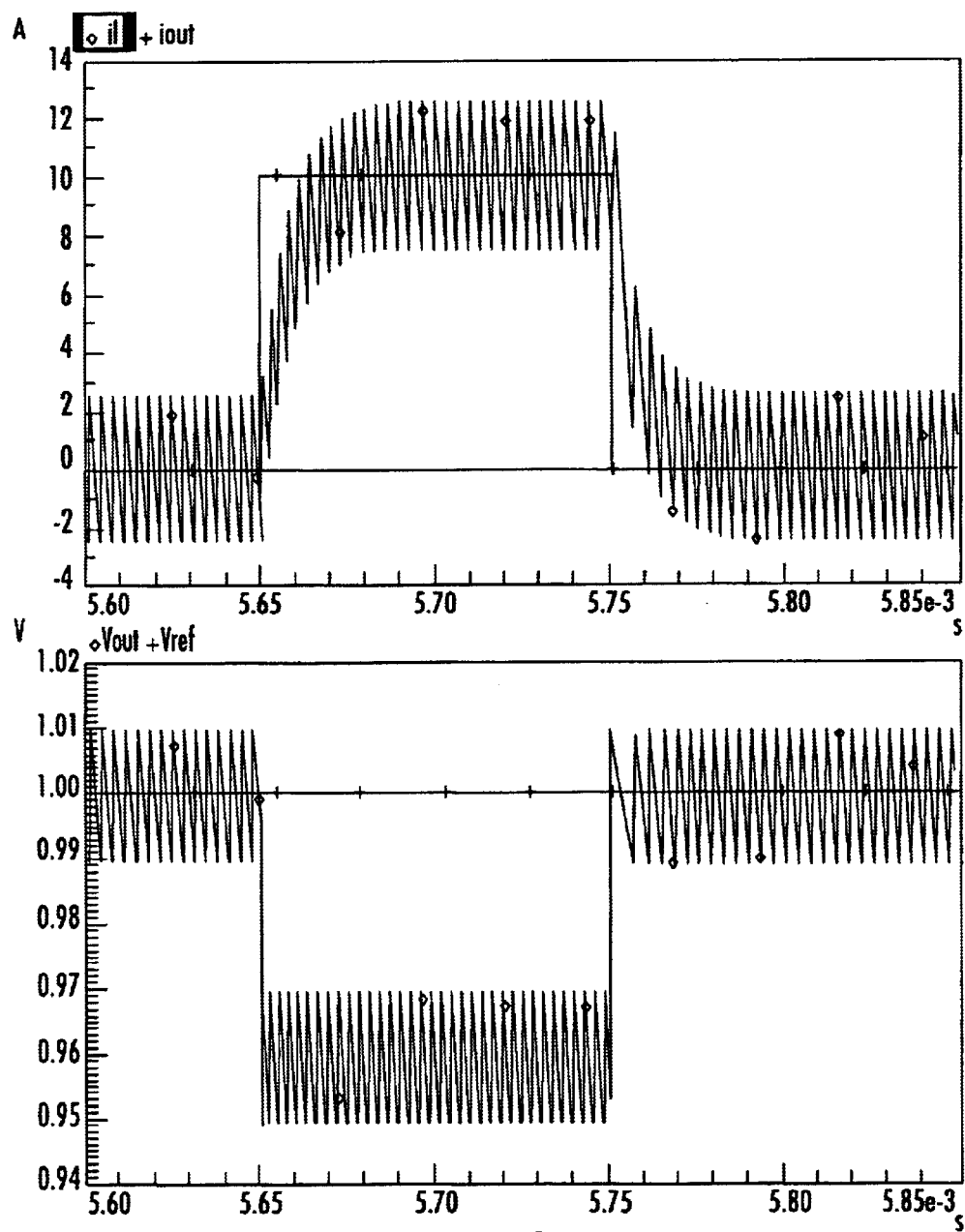
FIG. 6 is a chart showing the main signals of the circuits of FIGS. 4 and 5.
Figure 7:
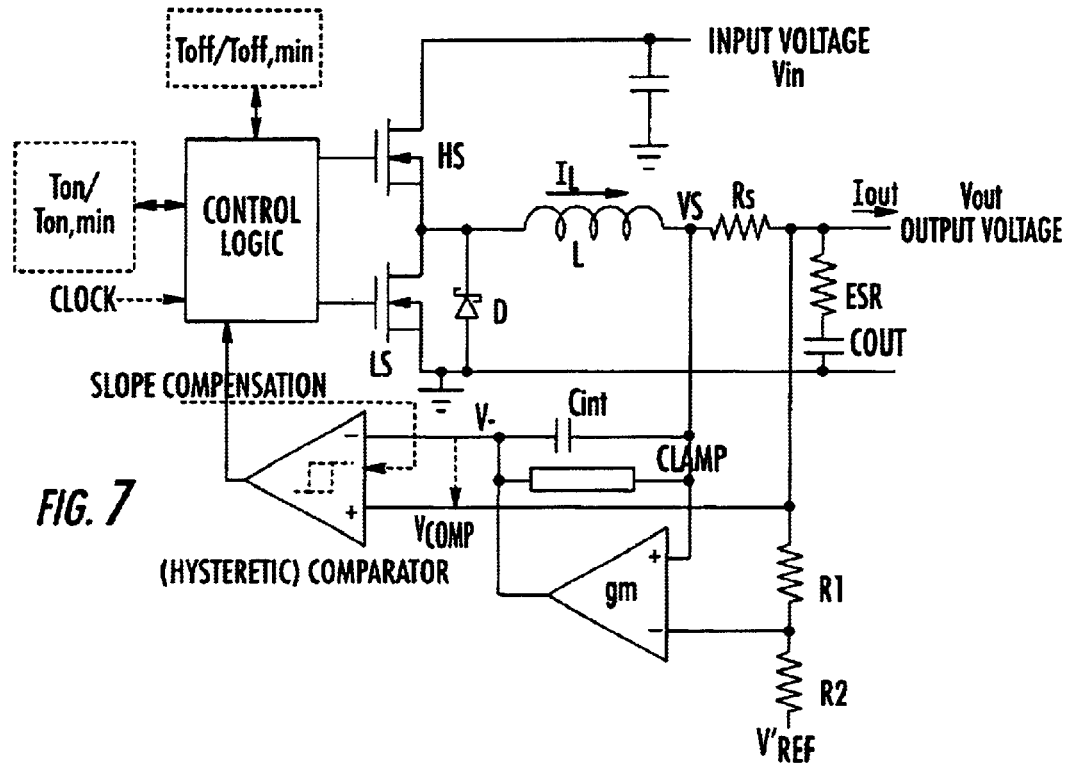
FIGS. 7 and 8 are schematic diagrams depicting two preferred embodiments of the regulator of the present invention.
Figure 8:
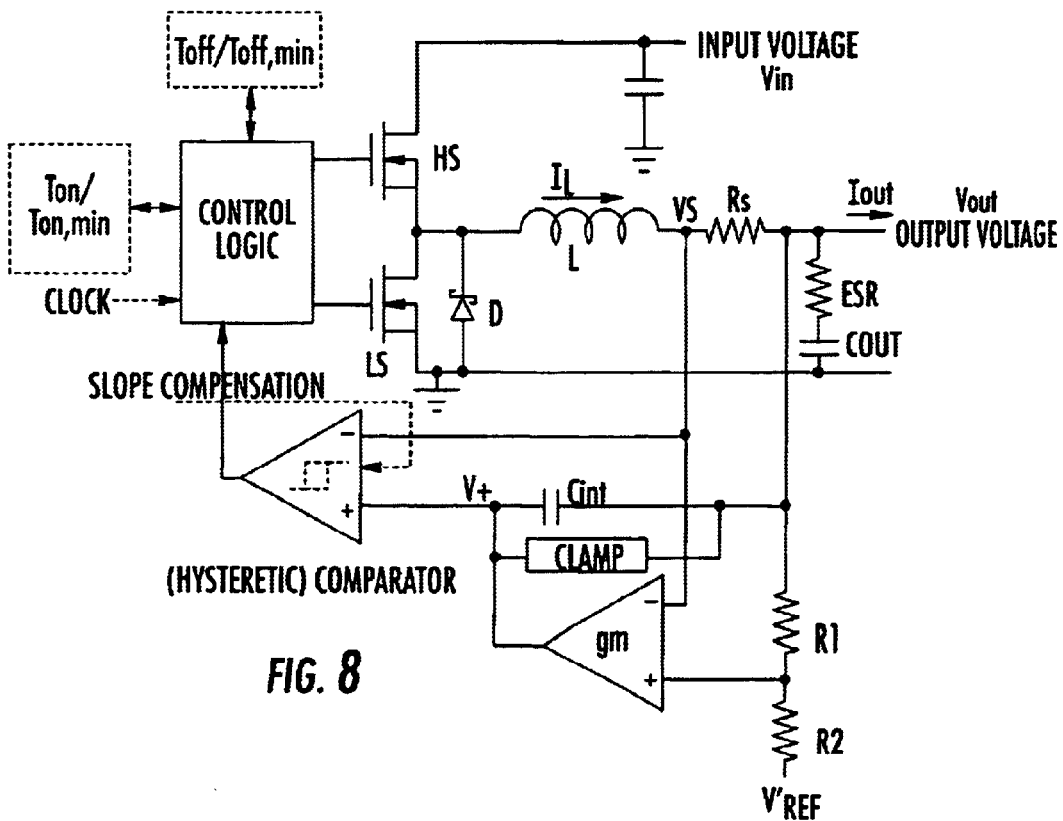

Two embodiments of the regulator of this invention are depicted in FIGS. 7 and 8. For the purpose of illustrating how to realize a regulator according to the method of this invention, reference will be made to a step-down regulator. As will be evident to any skilled person, the illustrated circuits may be easily adapted to realize switching regulators of different topology, for instance regulators employing transformers as long as they employ an inductor driven in PWM mode to deliver current to an output capacitor and to a load eventually connected in parallel to the output capacitor.

A common feature of all the voltage regulator topologies is the presence of an inductance through which, at least during a phase of the cycle, stored energy is discharged towards an output buffer capacitor and thus towards the electric load. For example, in step-up regulators, the current $I_{SW}$ injected in the output capacitor through a switch is the current that flows through the inductor during a discharge phase of the inductance. The invention is directly applicable to step-up regulators whenever the control process contemplates that the comparator determines the start of a charge phase of the inductor, for example with a constant turn on time $T_{ON}$. In case of a constant turn off time $T_{OFF}$ mode, the voltage $V_{COMP}$ may be generated according to the following relations $$\begin{cases} V_{COMP} = R_S I_L + V_{INT} \\ V_{INT} = \dfrac{K_{INT}}{s}(\alpha(V_{OUT} - V'_{REF}) + R_S I_{SW}) \end{cases} \quad (24b)$$

The parameters R1, R2, $g_m$, $C_{INT}$ are preferably chosen such that $$\begin{cases} \dfrac{g_m}{C_{INT}} = \dfrac{1}{ESR \cdot C_{OUT}} \\ \dfrac{R_1}{R_1 + R_2} = \dfrac{R_S}{R_O} \end{cases} \quad (25)$$

In the case in which the error amplifier $g_m$ of the mentioned figures is capable of supplying a maximum current $\pm I_{INT,MAX}$, it must be ensured that $$\dfrac{I_{INT,MAX}}{C_{INT}} > R_S \dfrac{\Delta I_{OUT,MAX}}{R_O C_{OUT}} \quad (26)$$

to make the current flowing in the inductor vary with the desired speed.

Now the ripple of the signal $V_{COMP}$ is given by $$V_{COMP,R} = I_{RIPPLE} \cdot R_S \dfrac{1 + s R_O C_{OUT}}{s R_O C_{OUT}} \cdot \dfrac{1 + s T_C}{s T_c}. \quad (27)$$

For reasons of stability, it must be $$T_C \gg T_S \quad (28)$$

This condition is more restrictive of the condition $R_O C_{OUT} \gg T_S$ required by known regulators, but it is satisfied for all kinds of commonly used capacitors (e.g. tantalum capacitors) as output capacitors.

Optionally, the regulators of FIG. 7 or 8 may be provided with a clamping device CLAMP for limiting the product $R_S \cdot I_L$ and, as a consequence also the current delivered by the regulator to the parallel of the output capacitor $C_{OUT}$ and the load. In this way, the first addend of eq. 24 is prevented from exceeding certain bounds, thus avoiding excessive under-voltages or overvoltages in situations such as the turning on of the regulator or the changing of the reference voltage (an event that is contemplated for certain types of microprocessors and typically carried out with a null load). In general, the clamping device CLAMP is useful in all these conditions in which the current in the inductor increases at the maximum allowed speed, that is in slew-rate conditions.

The lower threshold of intervention of the clamp determines the current with which the regulator discharge $C_{OUT}$ when the reference voltage is reduced, and thus must be negative, while the upper threshold of intervention must be positive and greater than the product $R_S \cdot I_{OUT,MAX}$. The latter limit depends from the maximum current $I_{OUT,MAX}$ that is delivered for instance in the case of a short-circuit of the output or when the reference voltage is increased. In any case, the intervention thresholds of the clamp must be fixed so that it does not intervene during a load transient.

It is possible to obtain a limitation of the maximum positive and negative current that may flow in the inductor even by employing comparators of maximum positive and negative current, respectively, not shown in the figure. In this case, the intervention thresholds of the clamp must define a range that contains the range of variation determined by the maximum and minimum current comparators.

In general, eq. 27, modified to take into account the presence of the clamp, becomes $$V_{COMP} = V_{INT} + R_S I_L \quad (29)$$

wherein $V_{INT}$ is $$V_{INT} = \dfrac{K_{INT}}{s}[\alpha(V_{OUT} - V'_{REF}) + R_S I_L - F_{CLAMP}(V_{INT})]. \quad (30)$$

Figure 9:
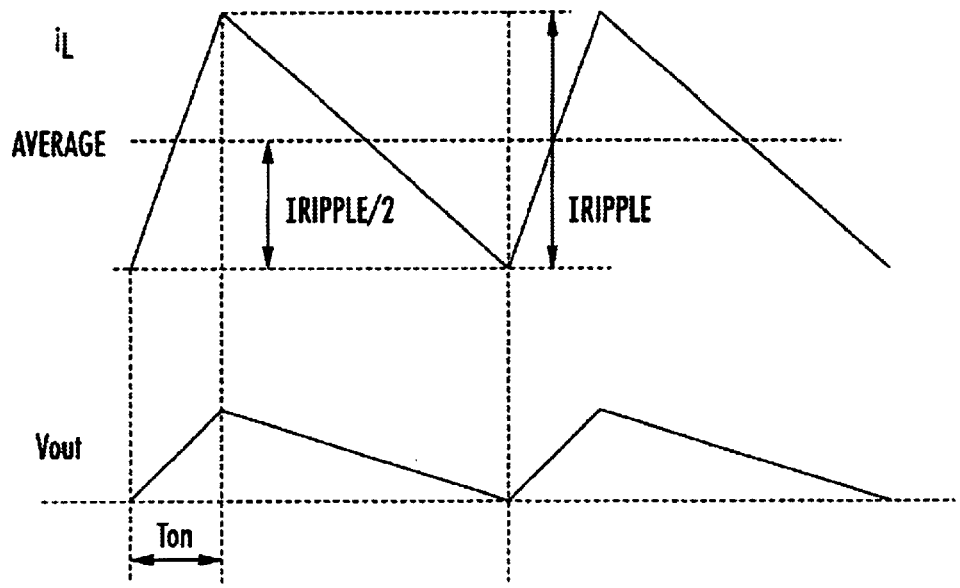
FIG. 9 is a waveform of the output voltage and of the current flowing in the inductor of the regulators of FIGS. 7 and 8 operating in a continuous mode with a constant turn on time.
Figure 10:
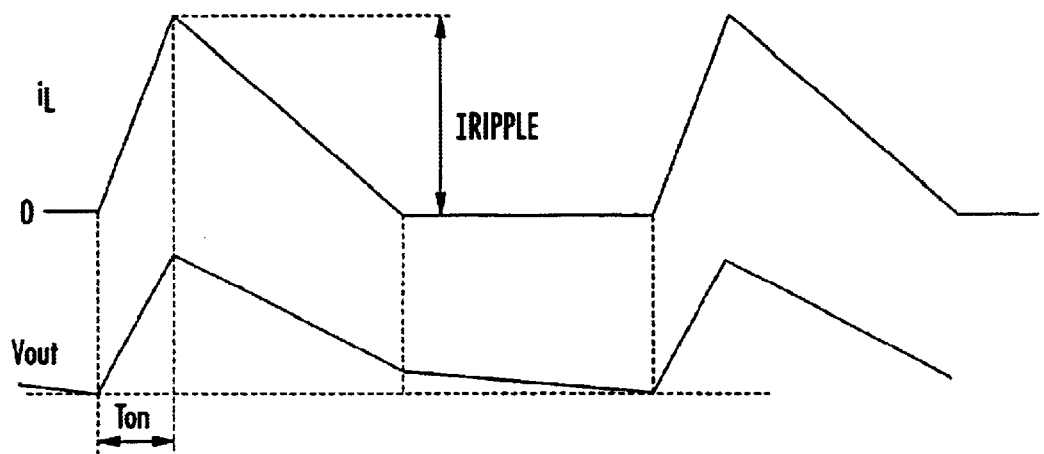
FIG. 10 is a waveform of the output voltage and of the current flowing in the inductor of the regulators of FIGS. 7 and 8 driven in discontinuous mode with a constant turn on time.

A switching regulator may operate in continuous current mode (CCM), in which the current in the inductor is never null, or in discontinuous current mode (DCM) in which for a certain time interval the current is null. FIGS. 9 and 10 show waveforms of the current flowing in the inductor and of the output voltage in the case of a constant turn-on time TON control in both situations. For a discontinuous control mode, it is necessary to use a zero-cross comparator (not shown in FIGS. 7 and 8) that turns off the switch LS when the current flowing in it becomes null.

The discontinuous current mode (DCM) intervenes under low load conditions, that is when the current in the inductor is smaller than $I_{RIPPLE}/2$, being $I_{RIPPLE}$ the peak-to-peak amplitude of the current ripple in the inductor in the continuous current mode (CCM). In case of a constant turn-on time TON control, the switching frequency in DCM is reduced in respect to the frequency in CCM when the load diminishes, allowing for an increase of the efficiency of the regulator under low load conditions. In DCM, the current provided to the parallel of the output capacitor $C_{OUT}$ and the load cannot be negative. Therefore, it is convenient to make the regulator work temporarily in CCM if the reference voltage must be lowered and if the load is very low.

The circuit of FIG. 7 or of FIG. 8 may operate in DCM with constant turn on time $T_{ON}$, but not with constant turn off time $T_{OFF}$. In DCM, with a very low load, the interval in which $I_L=0$ is rather long and the integral at the right side of eq. (30) assumes even larger negative values. This may slow the response to a load transient if it takes place during this interval. To prevent this inconvenience it is preferable to choose the lower threshold of the clamp equal to zero or negative with a relatively small absolute value. On the contrary, if the inductor is driven in CCM even at low load (for instance, to change the reference voltage), the lower intervention threshold of the clamp must be negative to ensure that the current in the inductor may be negative and of sufficiently high level to discharge rapidly the output capacitor $C_{OUT}$.

Figure 11:
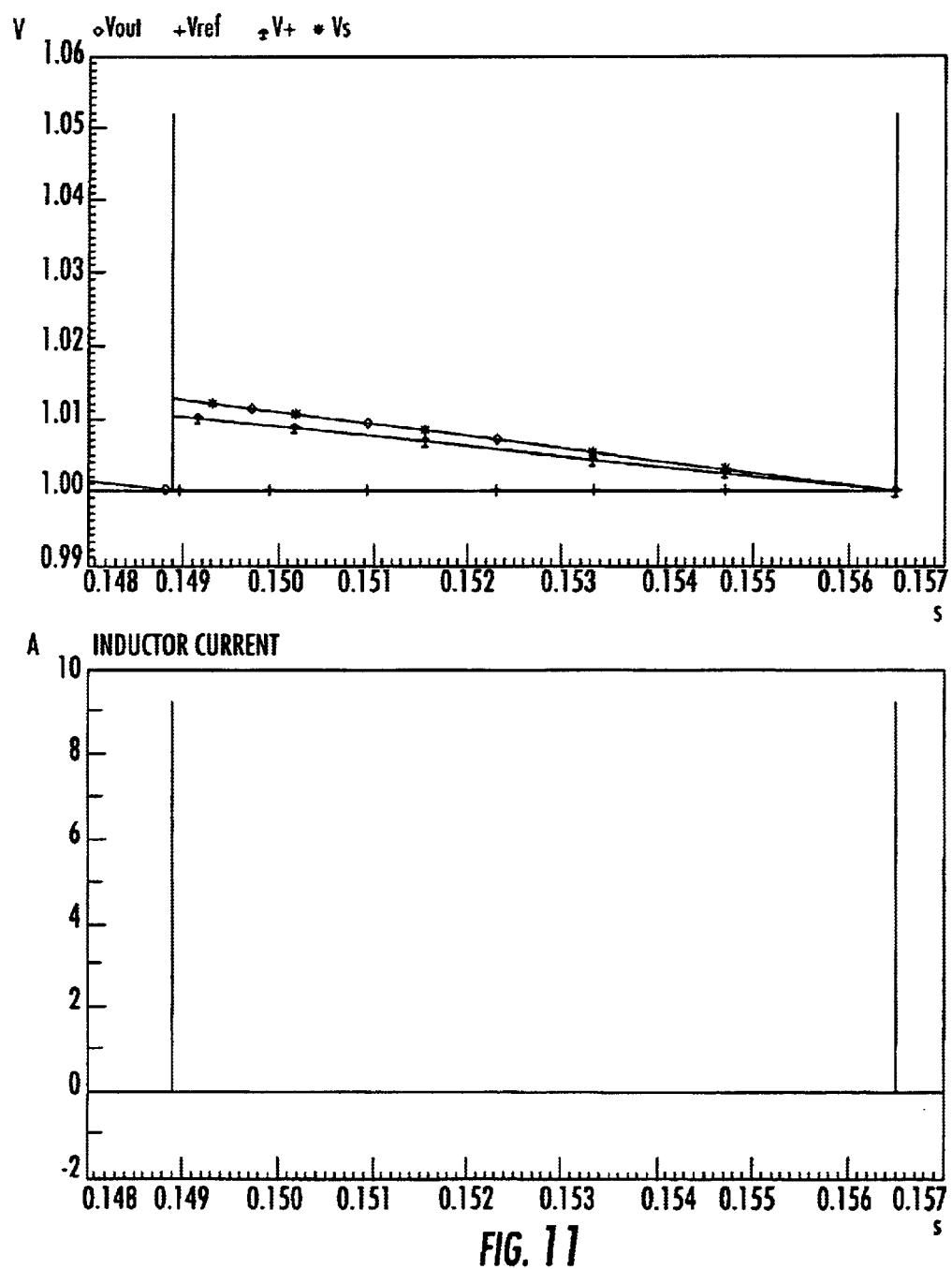
FIG. 11 shows waveforms of the main signals of the regulator of FIG. 8 functioning in a discontinuous mode under low load conditions.
Figure 12:
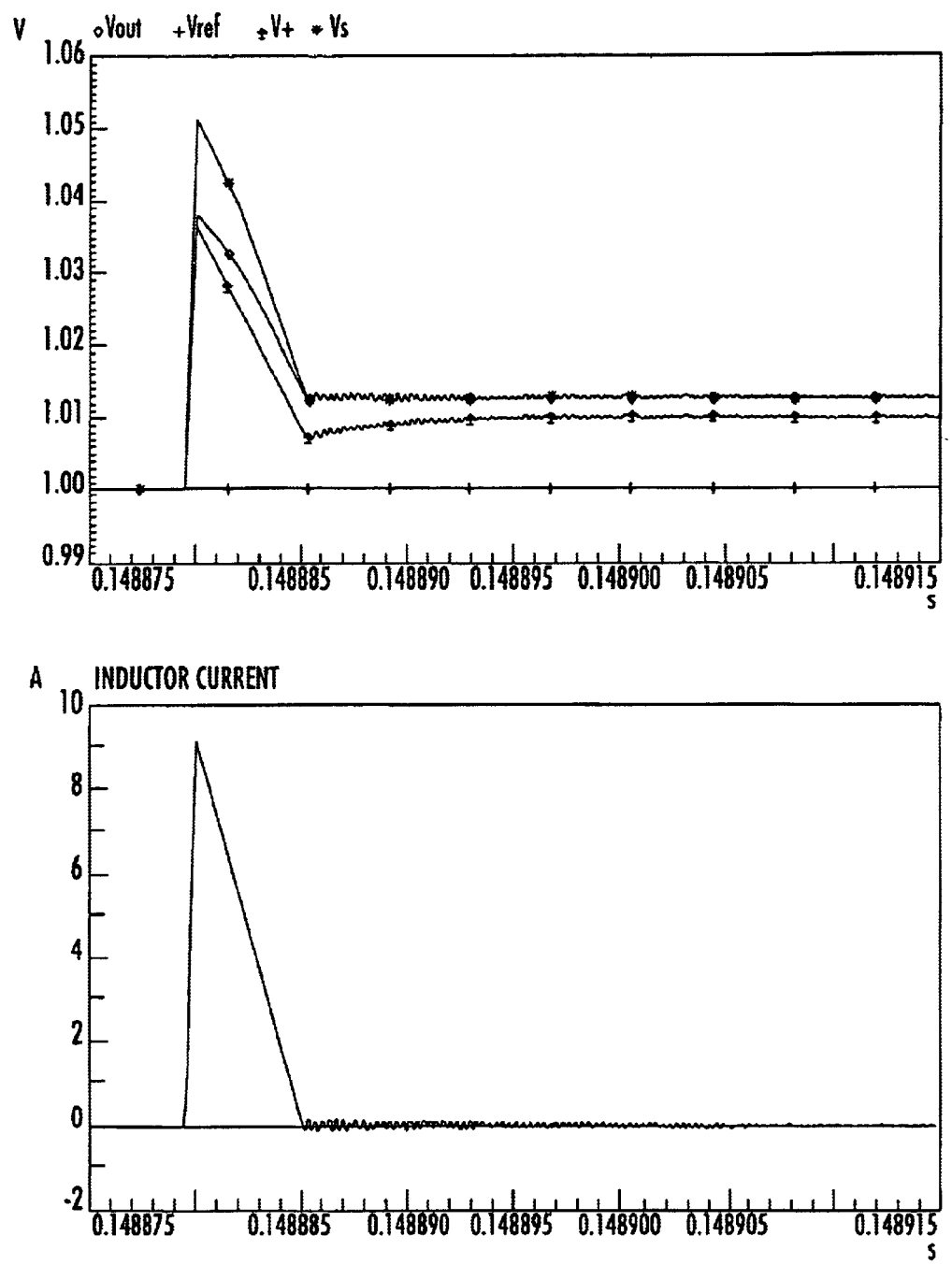
FIG. 12 shows in greater detail the diagrams of FIG. 11.

FIGS. 11 and 12 are diagrams of the main signals of the circuit of FIG. 8 in discontinuous current mode at very low load, for a constant turn on time $T_{ON}$ control with the following electrical parameters:

L=0.6 µH; $V_{IN}$=12V; $R_S$=1.5 mΩ; ESR=2 mΩ; resistance of the clamp≈0.5/$g_m$; $C_{OUT}$=2 mF.

It may be noted that the lower peak of the output voltage $V_{OUT}$ is regulated at the voltage $V'_{REF}$, given by eq. 6, thus the output voltage $V_{OUT}$ is slightly greater than $V'_{REF}$. This fact must be taken into account when choosing the reference voltage $V'_{REF}$. In these conditions, the control behaves as the known ones.

Lowering the frequency at low load conditions in a constant turn off time $T_{OFF}$ control or in a forced turn on synchronous control, is more complicated than described above. For instance, DCM functioning in case of a synchronous control keeps constant the frequency while reducing the peak current. For this reason DCM driving is not able per se to ensure a high efficiency under low load conditions, even if at a constant frequency and at low load it is more efficient than the CCM mode. In this case, when the load current is smaller than a certain threshold, it is possible to let the regulator operate in burst mode, that is with intervals in which the regulator operates in CCM (or DCM) forcing the current in the inductor equal to the threshold value, alternate with intervals in which the current is null (there are not any switchings).

To this end, it is possible to choose a positive upper intervention threshold corresponding to the load threshold. The switched driving mode is stopped or resumed by a hysteresis comparator of the quantity $F_{CLAMP}(V_{INT})$ defined hereinbefore. In the circuits of this invention, such a comparator compares the current flowing in the clamp with two suitable thresholds.

The advantages of the circuits made according to this invention derive from the high (theoretically infinite) DC gain of the integrator that eliminates the effects on the output of the offset of the comparator and of the current ripple. The integrator, that may be realized with a transconductance amplifier loaded with an integration capacitance, and the clamp are components that are commonly present in classic $V^2$ or current-mode controls wherein the present invention may be readily implemented. The regulator of the invention solves the technical problems of inaccuracy caused by the offset of the comparator. As stated before, in known regulators the error on the output voltage $V_{OUT}$, in respect to the reference, due to the offset voltage $V_{OFFSET,CMP}$ is given by:

$$\frac{R_O}{R_S} \cdot V_{OFFSET,CMP} \tag{21}$$

This offset voltage is due to many causes, such as the statistical offset, the effect of the delay of the comparator and the induced parasitic voltage.

Statistical offset and delay are generally tied to each other, that is a comparator designed to have a reduced statistical offset, has in general a relatively high delay time. Conversely, the offset of the integrator, which influences the output according to an equation similar to eq. 21, may be made (almost) arbitrarily small because there are not particular speed constraints in the design of the integrator.

According to this invention, the error $I_{RIPPLE}/2$ present in known regulators with constant turn on time $T_{ON}$ control is eliminated by the presence of the integrator. The improvements in terms of accuracy that are accomplished by the invention tend to vanish when the load becomes very low and the regulator operates in discontinuous mode, because of the intervention of the clamp. However, in these cases, the equivalent offset due to the delay of the comparator is minimum while the offset due to the induced voltage is null.

Figure 13:
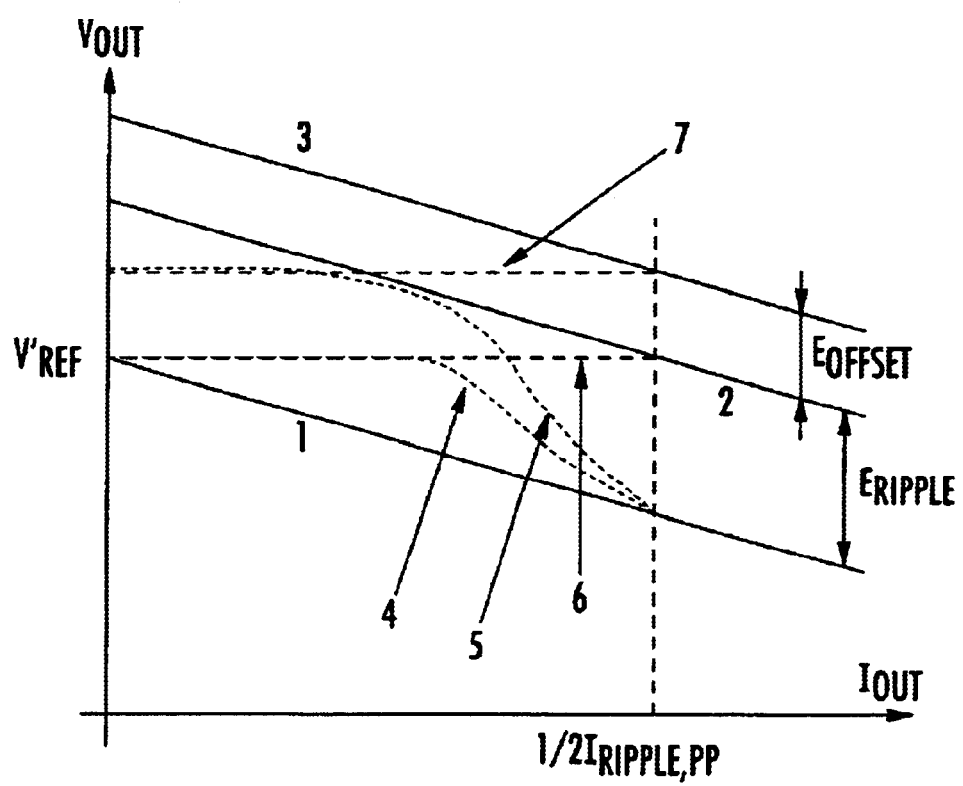
FIG. 13 is a graph comparing the voltage-current characteristics of a regulator of this invention with those of known regulators functioning with a constant turn on time.

FIG. 13 compares the voltage-current characteristics of a regulator of this invention and of a known regulator controlled with constant turn on time $T_{ON}$. The dash line curves refer to a DCM control while the continuous line curves refer to a CCM control. The curve 1 is that of a regulator of this invention. It reproduces the ideal conditions in which $$V_{OUT}=V'_{REF}-R_{OUT} I_{OUT} \tag{31}$$

The curve 2 corresponds to that of a known regulator, in which precautionary measures have been taken to nullify the offset and the voltage that the inductor induces in the circuit that generates the signal $V_{COMP}$: the voltage $E_{RIPPLE}$ is the difference between these two characteristics and is equal to ½ESR·$I_{RIPPLE}$, corresponding to an error on the measured current equal to ½$I_{RIPPLE}$.

The curve 3 is the voltage-current characteristic of a known regulator in which these precautionary measures have not been taken. As it is possible to notice, in this last case the curve 3 exceeds the curve 2 by a quantity corresponding to the offset voltage $E_{OFFSET}$. The curve 4 is a voltage-current characteristic of a regulator of the invention having a minimum current clamp with a threshold corresponding to a null output current and a resistance equal to the inverse of the transconductance of the integrator. The curve 4 accounts for only the ripple effect on the current, while the curve 5 accounts for also the offset voltage, the delay and the induced voltage.

These voltage-current curves may be compared with the corresponding characteristics 6 and 7 of known regulators. As noted above, there are not accuracy improvements in respect to the known regulators when the regulator functions in discontinuous mode and the load is very low. However, when the load increases the voltage-current characteristic of the regulator of this invention tends to the ideal curve 1, while the characteristics of the known regulators remain far from it.

That which is claimed is:

1. A method of regulating the supply voltage of a load via a switching voltage regulator having an inductor driven by at least a power switch for delivering current to an output capacitor with a parasitic series resistance and connected between an output node of the regulator and ground and to a load connected in parallel to the capacitor, the method comprising:

establishing a reference voltage;

generating a comparison signal as the sum of a first voltage signal proportional to the current circulating in the inductor according to a certain proportionality coefficient and of a second voltage signal function of the difference between the output voltage and said reference voltage and of said first voltage signal;

comparing said comparison signal with at least a threshold for generating a logic signal that switches between an active state and an inactive state and each time that the threshold is crossed;

controlling said power switch as a function of the state of said logic signal;

wherein the second voltage signal is generated by integrating the sum between said first signal and the difference, multiplied by a certain quantity (a), between the output voltage ($V_{OUT}$) of the regulator and said reference voltage ($V'_{REF}$).

2. The method of regulation of claim 1, wherein said logic signal is generated by comparing said comparison signal ($V_{COMP}$) with an upper threshold and a lower threshold in a hysteretical mode.

3. The method of claim 1, wherein said certain quantity (a) is the ratio between said proportionality coefficient (Rs) and the output resistance (Ro) of the regulator under steady state conditions, said integration being carried out with an integration constant (KzxT) equal to the inverse of the product between the capacitance of said output capacitor (CouT) and said parasitic series resistance (ESR).

4. A switching voltage regulator comprising an inductor (L) driven by at least a power switch for delivering current to an output capacitor ($C_{OUT}$) having a certain parasitic series resistance (ESR) connected between an output node and ground and to an electric load connected in parallel to the capacitor ($C_{OUT}$), a logic control circuit of said switch, circuit means for generating a voltage signal proportional to the current flowing in the inductor (L) according to a certain proportionality coefficient ($R_S$), second circuit means ($g_m$, R1, R2, C1, $V'_{REF}$) for generating an amplified and filtered error signal (V−; V+), and a comparator comparing said amplified and filtered error signal and said voltage signal proportional to the current in the inductor (L) and generating a logic signal applied to an input of the logic control circuit of said power switch, characterized in that said second circuit means comprise an integrator ($g_m$, $C_{INT}$, R1, R2) of the sum between said voltage signal and the difference, scaled of a certain quantity (α), between the output voltage and a reference voltage ($V'_{REF}$).

5. The regulator of claim 4, wherein said first circuit means consist in a sensing resistor ($R_S$) connected in series to said inductor (L) toward the output node of the regulator.

6. The regulator of claim 4, characterized in that the capacitance of said output capacitor ($C_{OUT}$) is greater than the ratio between a maximum admissible variation of the output current ($\Delta I_{OUT,MAX}$) and the product between the parasitic series resistance thereof (ESR) and a maximum admissible speed variation of the current flowing in the inductor (m).

7. The regulator of claim 4, characterized in that the capacitance of said output capacitor ($C_{OUT}$) is greater than the ratio between a maximum admissible variation of the output current ($\Delta I_{OUT,MAX}$) and the product between the output resistance thereof ($R_O$) of the regulator in steady state conditions and a maximum admissible speed variation of the current flowing in the inductor (m), being said output resistance ($R_O$) greater than the parasitic series resistance (ESR).

8. The regulator according to claim 4, characterized in that said integrator comprises circuit means capable of preventing that the output thereof exceeds a maximum and a minimum value.

9. The regulator according to claim 4, characterized in that said quantity (a) is equal to the ratio between said coefficient ($R_S$) and the output resistance ($R_O$) of the regulator under steady state conditions, said integrator ($g_m$, $C_{INT}$, R1, R2) having an integration constant ($K_{INT}$) equal to the inverse of the product between the capacity of said output capacitor ($C_{OUT}$) and said parasitic series resistance (ESR).

10. The regulator of claim 4, wherein said inductor is driven by a half-bridge power stage connected between a not regulated voltage source node and the ground node of the circuit.

11. The regulator of claim 5, characterized in that said integrator ($g_m$, $C_{INT}$, R1, R2) comprises a resistive voltage divider (R1, R2), constituted by a pair of resistors first (R1) and second (R2), connected between said output node of the regulator and a node at said reference voltage ($V'_{REF}$), an error amplifier ($g_m$) having a non inverting input (+) connected to the common node between said inductor (L) and said sensing resistance ($R_S$) and an inverting input (−) coupled to the intermediate voltage node between said first resistor (R1) and said second resistor (R2), and an integration capacitor ($C_{INT}$) connected between said non inverting node (+) and an output of said error amplifier ($g_m$), said comparator having an inverting input connected to the output of said amplifier and a non inverting input connected to said output node of the regulator.

12. The regulator of claim 5, characterized in that said integrator ($g_m$, $C_{INT}$, R1, R2) comprises a resistive voltage divider (R1, R2), constituted by a pair of resistors first (R1) and second (R2), connected between said output node of the regulator and a node at said reference voltage ($V'_{REF}$), an error amplifier ($g_m$) having an inverting input (−) connected to the common node between said inductor (L) and said sensing resistance ($R_S$) and a non inverting input (+) coupled to an intermediate voltage node between said first resistor (R1) and said second resistor (R2), and an integration capacitor ($C_{INT}$) connected between said output node of the regulator and an output of said error amplifier ($g_m$), said comparator having an inverting input connected to the common node between said inductor (L) and said sensing resistance ($R_S$), and a non inverting input connected to the output of said amplifier ($g_m$).

13. The regulator according to claim 12, characterized in that said comparator is a comparator with hysteresis.

14. The regulator according to claim 12, characterized in that said integrator comprises a clamp (CLAMP) connected in parallel to said integration capacitor ($C_{INT}$).

15. The regulator according to claim 12, characterized in that the ratio between the transconductance of said amplifier ($g_m$) and the capacitance of said integration capacitor ($C_{INT}$) is equal to the inverse of the product between the capacitance of said output capacitor ($C_{OUT}$) and the parasitic series resistance (ESR) thereof, and the ratio between the value of said first resistor (R1) and the total resistance (R1+R2) of said resistive voltage divider is equal to the ratio between said sensing resistance ($R_S$) and the output resistance ($R_O$) of the regulator in steady state conditions.

16. The regulator according to claim 12, characterized in that said error amplifier ($g_m$) is capable of providing a maximum current ($I_{INT,MAX}$) greater than the ratio between the product of said sensing resistance ($R_S$) by the capacitance of said integration capacitor ($C_{INT}$) and by the maximum admissible variation of the output current ($\Delta I_{OUT,MAX}$), and the product between said output resistance ($R_O$) and the capacitance of said output capacitor ($C_{OUT}$).

17. The regulator of claim 14, characterized in that said clamp (CLAMP) has a negative lower intervention threshold.

18. The regulator of claim 14, characterized in that said clamp (CLAMP) has a positive upper intervention threshold.

19. A method of defining a switching voltage regulator comprising an inductor (L) driven by at least a power switch for delivering current to an output capacitor ($C_{OUT}$) having a certain parasitic series resistance (ESR), connected between an output node and ground, and to an electrical load connected in parallel to the capacitor ($C_{OUT}$), a logic control circuit of said switch, circuit means capable of generating a voltage signal proportional to the current in the inductor (L) according to a certain proportionality coefficient ($R_S$), second circuit means ($g_m$, R1, R2, C1, $V'_{REF}$) capable of generating an amplified and filtered error signal (V−; V+), and a comparator input with a comparison signal ($V_{COMP}$) function ($V_{COMP}=(V_{OUT}-V'_{REF})\cdot B(s)+R_S A(s) I_L$) of said amplified and filtered error signal and said voltage signal proportional to the current flowing in the inductor (L) for generating a logic signal applied to an input of said logic control circuit of said power switch, comprising the steps of:

establishing a maximum admissible variation speed (m) of the current flowing in said inductor, establishing a maximum admissible variation of the output current ($\Delta I_{OUT,MAX}$), establishing a maximum admissible variation of the output voltage ($\Delta V_{OUT,MAX}$), choosing the value of the output resistance ($R_O$) of the regulator under steady state conditions alternatively between the value given by $\Delta V_{OUT,MAX}/\Delta I_{OUT,MAX}$ and the value of said parasitic series resistance (ESR), choosing the capacitance of the output capacitor ($C_{OUT}$) equal to or greater than the ratio $\Delta I_{OUT,MAX}/(m\cdot R_O)$, fixing a certain reference voltage ($V'_{REF}$), with which to compare the output voltage ($V_{OUT}$), determining complex proportionality functions, first (A(s)) and second (B(s)), of said comparison signal ($V_{COMP}$) with the current circulating in the inductor ($I_L$) and the difference between said output voltage ($V_{OUT}$) and said reference voltage ($V'_{REF}$), in function of a certain quantity ($\alpha$):

$$\begin{cases} A(s) = \dfrac{K_{INT}}{S} + 1 \\ B(s) = \alpha \dfrac{K_{INT}}{S} \end{cases}$$

being $$K_{INT} = \dfrac{1}{ESR \cdot C_{OUT}}$$

and said certain quantity ($\alpha$) being $$\alpha = \dfrac{R_S}{R_O}.$$

* * * * *

UNITED STATES PATENT AND TRADEMARK OFFICE
CERTIFICATE OF CORRECTION

PATENT NO. : 6,894,471 B2
DATED : May 17, 2005
INVENTOR(S) : Corva et al.

It is certified that error appears in the above-identified patent and that said Letters Patent is hereby corrected as shown below:

Column 2,
Line 23, delete "ERS" insert -- ESR --.

Column 3,
Line 57, delete "example of" insert -- example --.

Column 4,
Line 36, delete "ESR · $\Delta_{OUT,MAX}$" insert -- ESR · $\Delta I_{OUT,MAX}$ --.

Column 10,
Lines 45 and 54, delete "TON" insert -- $T_{ON}$ --.

Column 13,
Lines 5, 13 and 62, delete "(a)" insert -- (α) --.
Line 16, delete "KzxT" insert -- $K_{INT}$ --.
Line 18, delete "CouT" insert -- $C_{OUT}$ --.

Signed and Sealed this

Fourth Day of October, 2005

JON W. DUDAS
*Director of the United States Patent and Trademark Office*